United States Patent
Atlas et al.

(10) Patent No.: US 10,433,629 B2
(45) Date of Patent: Oct. 8, 2019

(54) FINGERNAIL TIP STYLUS

(71) Applicant: Texting Tip LLC, Lago Vista, TX (US)

(72) Inventors: Brian Atlas, Lago Vista, TX (US); James Tour, Bellaire, TX (US); Yieu Chyan, Houston, TX (US)

(73) Assignee: TEXTING TIP LLC, Lago Vista, TX (US)

( * ) Notice: Subject to any disclaimer, the term of this patent is extended or adjusted under 35 U.S.C. 154(b) by 0 days.

(21) Appl. No.: 16/233,157

(22) Filed: Dec. 27, 2018

(65) Prior Publication Data
US 2019/0200723 A1     Jul. 4, 2019

Related U.S. Application Data

(60) Provisional application No. 62/613,197, filed on Jan. 3, 2018.

(51) Int. Cl.
*G06F 3/0354* (2013.01)
*A45D 31/00* (2006.01)
*G06F 3/0488* (2013.01)
*A45D 29/00* (2006.01)

(52) U.S. Cl.
CPC ........... *A45D 31/00* (2013.01); *G06F 3/0354* (2013.01); *G06F 3/03545* (2013.01); *G06F 3/0488* (2013.01); *A45D 29/00* (2013.01); *G06F 2203/0331* (2013.01)

(58) Field of Classification Search
CPC ...... A45D 31/00; A45D 29/00; G06F 3/0354; G06F 3/0488; G06F 3/03545
See application file for complete search history.

(56) References Cited

U.S. PATENT DOCUMENTS

| | | | |
|---|---|---|---|
| 6,902,688 B2 | 6/2005 | Narayan et al. | |
| 8,970,559 B1 * | 3/2015 | McVickar | G06F 3/03545 345/156 |
| 2005/0093835 A1 | 5/2005 | Mortarelli | |
| 2008/0117189 A1 | 5/2008 | Flachsbart | |

(Continued)

FOREIGN PATENT DOCUMENTS

KR     10-1359023 B1     2/2014

OTHER PUBLICATIONS

PCT Search Report, for PCT/US2018/067581 dated Mar. 14, 2019.
PCT Written Opinion, for PCT/US2019/067581 dated Mar. 14, 2019.

*Primary Examiner* — Rodney Amadiz
(74) *Attorney, Agent, or Firm* — Eric P. Mirabel

(57) ABSTRACT

Disclosed is an elastic-fit fingernail-attached stylus, held to the end-portion of the user's fingernail (or to a fingernail extension) principally by an elastic fit around the fingernail/extension. The portion of the sleeve on the underside of the fingernail/extension includes a substantially transverse extension pointing in the direction of the user's fingertip and is designed to contact the flesh of the user's finger, when in use. A substantially spherical projection is on the opposite side of the sleeve with the forward most portion of the sphere and is designed to make contact with the touchscreen (or the keys of the touchscreen keyboard). The stylus is preferably formed of an elastomer, e.g., a silicone rubber composition, preferably including a conducting material.

19 Claims, 5 Drawing Sheets

(56) References Cited

U.S. PATENT DOCUMENTS

| | | | |
|---|---|---|---|
| 2008/0297493 A1* | 12/2008 | Adkins | G06F 3/03545 345/179 |
| 2009/0262637 A1* | 10/2009 | Badaye | G06F 3/03545 369/126 |
| 2013/0207900 A1* | 8/2013 | Harooni | G06F 3/039 345/173 |
| 2015/0268828 A1* | 9/2015 | Kajimoto | G06F 3/04845 715/771 |
| 2015/0282533 A1 | 10/2015 | Jiang et al. | |
| 2016/0018906 A1 | 1/2016 | Gottlieb | |

* cited by examiner

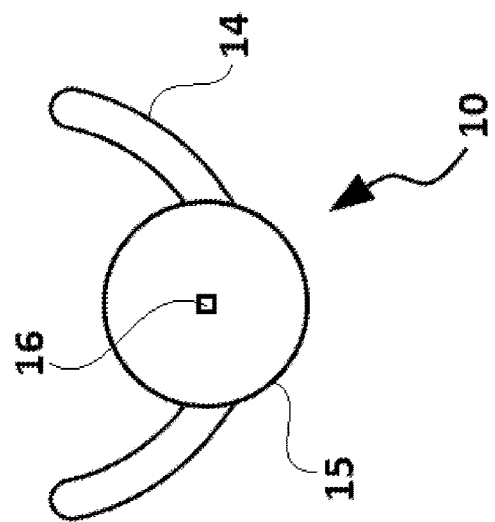
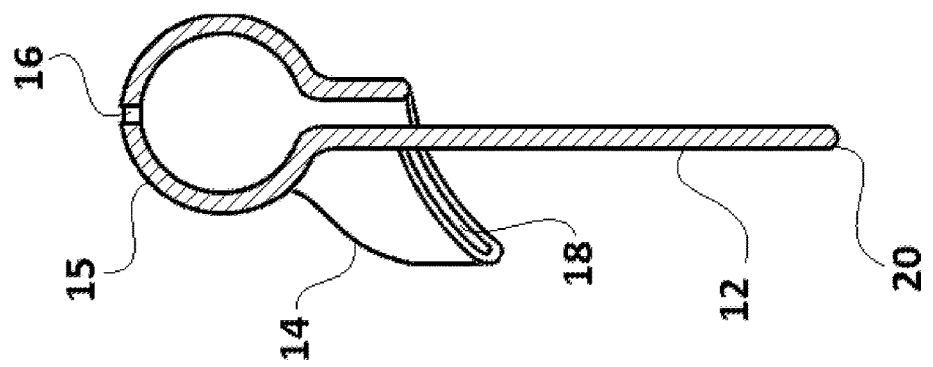

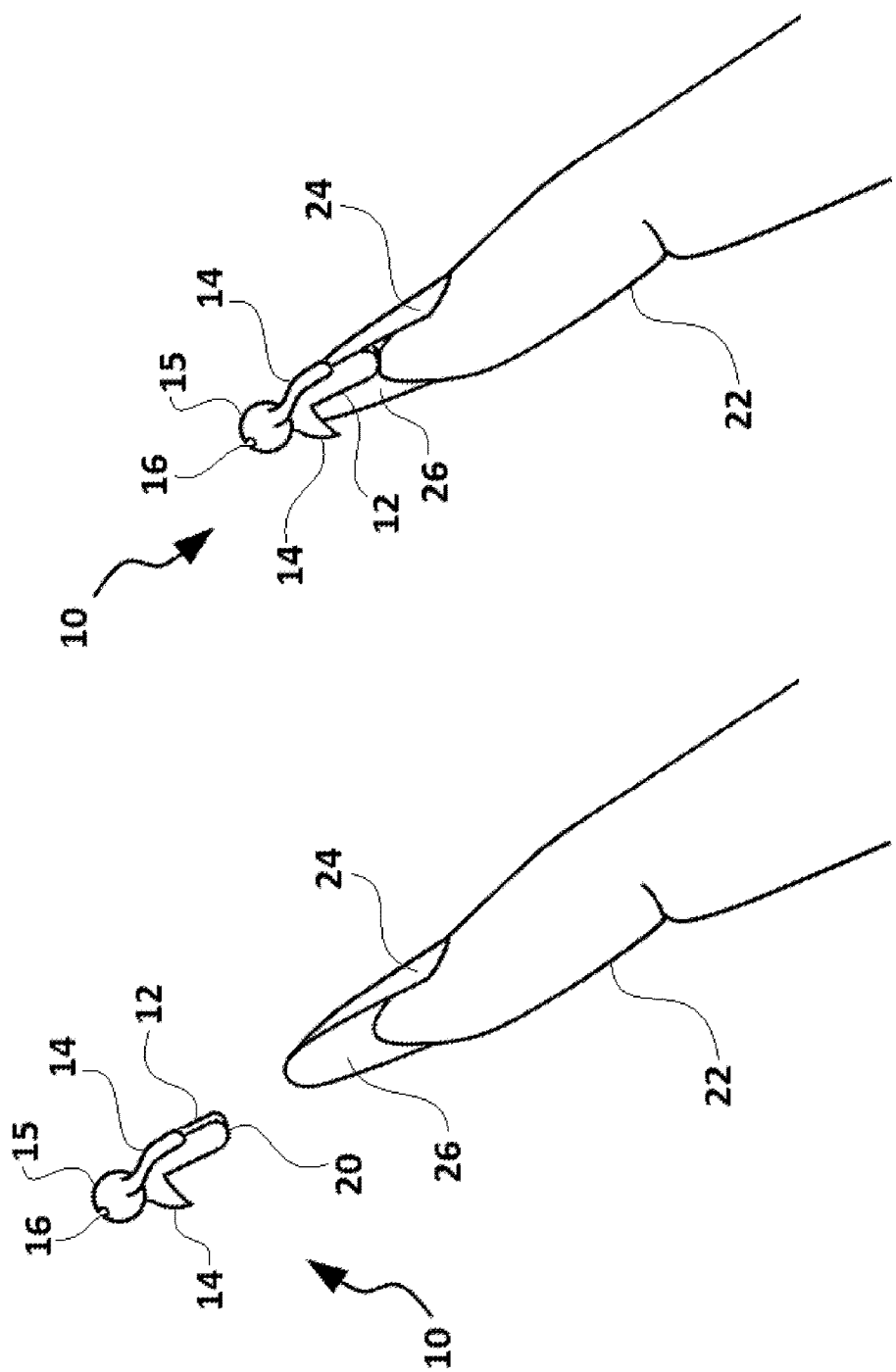

FINGERNAIL TIP STYLUS

BACKGROUND

There is a problem with accurately typing on or actuating a keyboard on a touchscreen device, such as a smartphone or tablet screen; as the finger contact surface tends to deform and grow with downward pressure, often leading to contact outside the keys' designated contact areas, which are capacitive touch sensors. This problem is enhanced for those electing to wear long and/or extension-added fingernails. And those choosing such fashion may in fact be forced to display at least one shorter-nailed digit, in order to be able to use such devices.

Extensions are generally made of insulators and will not activate such devices, as they can't transfer the body's capacitance nor do they have sufficient capacitance on their own. Even where coated and/or including conductive materials in the extensions, they lack sufficient contact surface area (i.e., only the leading edge of the extension is the contact area) to actuate the capacitive touch sensors of touchscreen devices.

Touchscreen device touch sensors are actuated by the change in capacitance at a sensor by contact with flesh, like a fingertip, or another capacitor. The natural capacitance of the human body is 100-200 pf. Thus, contact results in an alteration in capacitance of the contact area, which is detected by the sensor. Fingernails and extensions have minimal electrical conductance and capacitance, making operation of touchscreen devices extremely difficult for those caught up in the fashion.

The invention herein allows those electing long fingernails/extensions the ability to reliably actuate a touchscreen device, by adding a form-fitting stylus.

SUMMARY

The invention consists of an elastic-fit fingernail-attached stylus, held to the end-portion of the user's fingernail (or to a fingernail extension) by an elastic fit around the fingernail/extension. Moisture/water or other fluid, gel or adhesive may be added between the contact surfaces (i.e., the inner surface of the sleeve of the device, and the fingernail/extension contact surface) to increase the surface tension and the security of the fit.

The portion of the sleeve on the underside of the fingernail/extension includes a substantially transverse extension pointing in the direction of the user's fingertip. The substantially transverse extension is designed to contact the flesh of the user's finger, when in use. A substantially spherical projection is on the opposite side of the sleeve with the forward most portion of the sphere designed to make contact with the touchscreen (or the keys of the touchscreen keyboard). The sphere may include a hole in the center of the forward most portion to aid in deformation, and help increase the surface contact area—by providing an avenue for escape of air from within the sphere. Also, by balancing the wall thickness, the sphere diameter and the elastic rebound properties of the material in the sphere's walls, the axial strength and frontal deformation of the sphere can be adjusted (with or without including a hole) to form a sphere with sufficient frontal deformation to actuate touchscreens readily, upon application of finger pressure (from a few ounces to one pound or so)—yet not expand the frontal contact surface outside the normal dimensions of touchscreen keys.

This deformable sphere may allow increased touch accuracy and more reliable operation as compared with a solid projection, which would lack such a variable contact surface area. With light pressure, the sphere deforms less, resulting in a smaller contacted surface area and higher contact accuracy. By pressing down more forcefully, a user can activate a screen that has a higher rejection threshold and thus requires more contact surface area. Adjustment of the pressure applied allows the user to emphasize accuracy and yet allow actuation of screens with a higher rejection threshold.

The device is preferably formed from liquid elastomeric components which are poured into a mold to set. After setting, the device may be painted. Dying the elastomeric mix when liquid, before molding, is another option—if adding color is desired.

The device may be offered in different sleeve sizes to accommodate different widths and lengthwise taper of fingernails/extensions. The preferred range is about 6 to 14 mm for the sleeve opening width, and more preferably about 12 mm. The diameter of the sphere is preferably about 4 to 8 mm, and more preferably about 6 mm. The sphere is sized and constructed (based on material strength and wall thickness) to allow the user to contact a single key on a device screen, in a one-at-a-time fashion.

The transverse extension is preferably at least about 9 mm, and may be substantially longer (14 mm or more) if desired. Longer transverse extensions may be cut off by the user to fit the user's selected length of fingernail/extension. After cutting, the remaining portion of the transverse extension merely needs to be long enough to contact the finger flesh surface, e.g., at the proximal tip of the finger.

The drawings and description below further exemplify and teach how to make and use the stylus described herein.

BRIEF DESCRIPTION OF THE DRAWINGS

FIG. 4 is a sectional view of the nail tip stylus of the invention, taken along the lines 4-4, in FIG. 2.

FIG. 5 is an end view of the nail tip stylus shown in FIGS. 1 to 4.

FIG. 6A is an exploded side view of the end of a user's index finger and the nail tip stylus of the invention.

FIG. 6B is a side view of the end of a user's index finger which is rotated slightly to expose some of the lower finger surface, and having the nail tip stylus of the invention in place on a fingernail extension.

DETAILED DESCRIPTION

Figure 1:
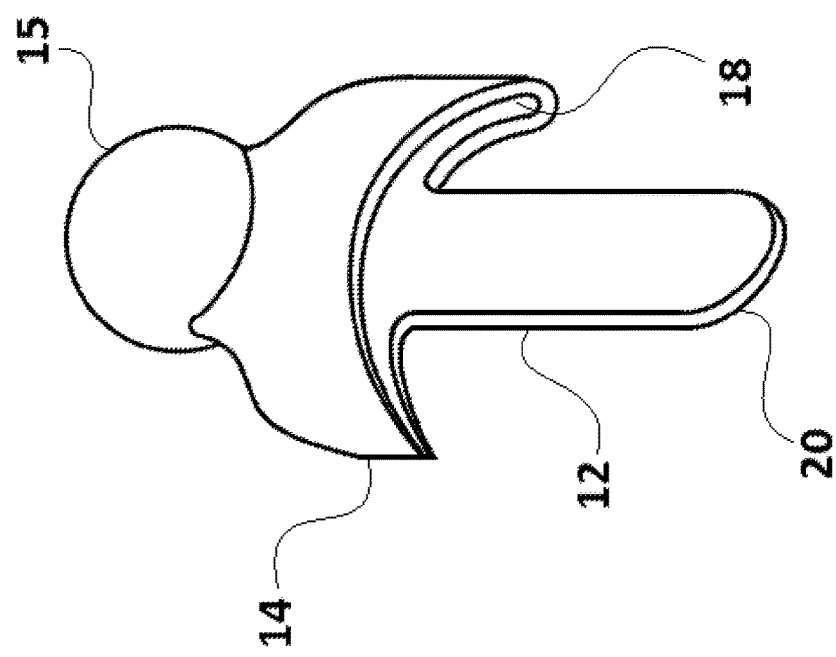
FIG. 1 is a perspective view from above of an embodiment of the nail tip stylus of the invention.
Figure 3:
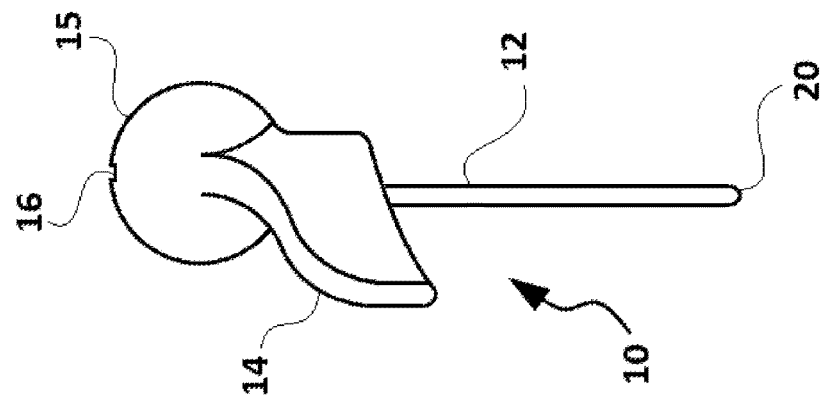
FIG. 3 is a side view of the nail tip stylus of the invention.
Figure 2:
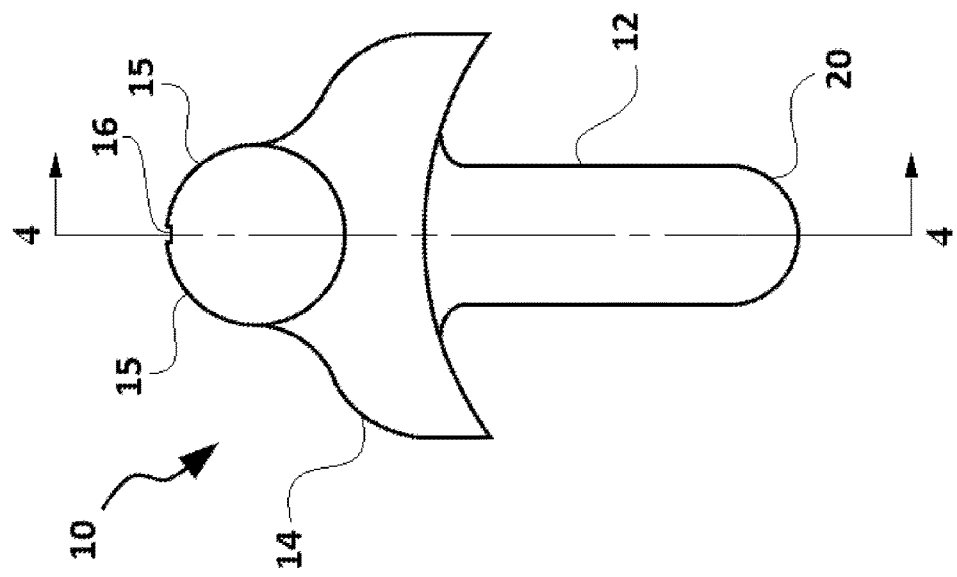
FIG. 2 is a plan view of the nail tip stylus of the invention.

FIGS. 1 to 7 show various views of a nail tip stylus 10. It can be seen that stylus 10 includes an extension 12 with an end portion 20, and a sleeve 14 (with an arc as shown) with an optional opening 18. A sphere 15 is contiguous with the other portions of the stylus, and extends from the sleeve 14. Sphere 15 includes an optional hole or holes 16, which may aid it in deforming to form a larger contact surface area on a touchscreen. The preferred wall thickness of sphere 15 is in proportion to that shown in FIGS. 1 and 2; though, other thicknesses may be preferred with different materials.

A user's fingernail or extension (typically the index fingernail/extension) slides into sleeve 14, which is primarily formed of an elastomer, and preferably sized such that it is stretched to fit over the fingernail/extension (though it may be a looser fit as well). The fit, preferably enhanced by the addition of adhesive, holds stylus 10 in place on the user's fingernail, and the sphere 15 is positioned to contact touchscreen keys once in place. A relatively wide range of dimensions, as set forth in the Summary, can be suitably used. Differently-sized styluses 10 may be sold together to offer at least one suitable to fit different sized and shaped fingernail/extensions.

The stylus must be capable of conduction. One preferred elastomer for the stylus is silicone rubber; which, however, is an insulator. Conducting materials may be added to the silicone rubber. In a preferred embodiment, the conducting materials are added before the silicone rubber is molded, while it is liquid; and then mixed thoroughly. Suitable conducting materials include graphite (at up to 5 or more percent by weight of the composition) and other carbonaceous materials, including carbon black, acetylene black, graphene, graphene nanoribbons, MXene's, graphene fibers, nanotubes (single-, double-, triple-, few- or multi-walled; as well as nanotubes or nanotube fibers; as well as carbon nanotubes, and metal chalcogenide nanotubes). Other suitable conducting materials which could be in the composition instead of or in addition to the carbonaceous materials include one or more of: metallic particles, nanowires or nanoparticles, or microwires or microparticles (where the metal can be iron, silver, aluminum or copper among other types of conductive metals, alloys and mixtures of metals and alloys). Alternatively, metal-coated particles or beads can be employed.

In one preferred embodiment, the composition is formed of 60 to 65% methyl vinyl polysiloxane, 30 to 35% silicon dioxide, 2 to 5% silicone oil and up to 5% graphite. The composition is mixed thoroughly and molded in the stylus in a single mold operation. Alternatively, the portions of the device can be separately molded or fashioned, and assembled or glued together after fabrication.

The elastomer for the sleeve can be rubbers like: silicones (more preferably, 50 shore A durometer silicone), polybutadiene, butadiene-styrene, acrylonitrile-butadiene-styrene, fluoropolymers, and vinyl polymers in general, chain growth polymers, step-growth polymers, thermosets, thermoplastics, living polymers, metathesis polymers, and combinations of any of the above.

After molding, the stylus may be painted, so as to better match nail polish worn by the user, for example. The conductive or insulating properties of the paint (where it is conventional siloxane rubber paint) should not interfere with the transfer of charge through the stylus sufficiently to affect function in actuating touchscreens. Preferably, the portions of stylus that contact the touch screen and the human flesh (the distal ends of sphere 15 and extension 12), are not painted, thereby retaining the properties of the unpainted material at those locations to avoid substantial alterations in surface conductance through stylus 10.

The sphere 15 could instead be of a number of other shapes, and other materials may be used to form it. One could affix a more or less rigid portion of the stylus to actually contact the touchscreen, instead of the sphere 15. The relative diameter and the preferred wall thickness of the sphere 15, when used with 50 shore A durometer silicone as the primary polymer for constructing the sphere walls, with other additives of 30 to 35% silicon dioxide, 2 to 5% silicone oil and up to 5% graphite, are substantially similar to those shown in FIGS. 1 to 7. Other dimensions and designs are within the scope of the invention.

As nail extensions may be within the jurisdiction of the USFDA, it is advisable to reduce any regulated or prohibited contaminants in the extension composition, to within acceptable levels. Such contaminants may include some or all of: lead, mercury, cadmium, hexavalent chromium, polybrominated biphenyls (PBBs), polybrominated diphenyl ethers (PBDEs) and phthalates such as bis(2-ethylhexyl) phthalate (DEHP), butyl benzyl phthalate (BBP), dibutyl phthalate (DBP) and diisobutyl phthalate (DIBP); cobalt, arsenic, lead, chromium (VI), aluminum, zirconium, boron, strontium, zinc, antimony, cadmium, titanium and barium, molybdenum, boron lead bis(tetrafluoroborate), hexahydromethylphthalic anhydride, hexahydro-4-methylphthalic anhydride, hexahydro-1-methylphthalic anhydride, and hexahydro-3-methylphthalic anhydride.

Figure 7:
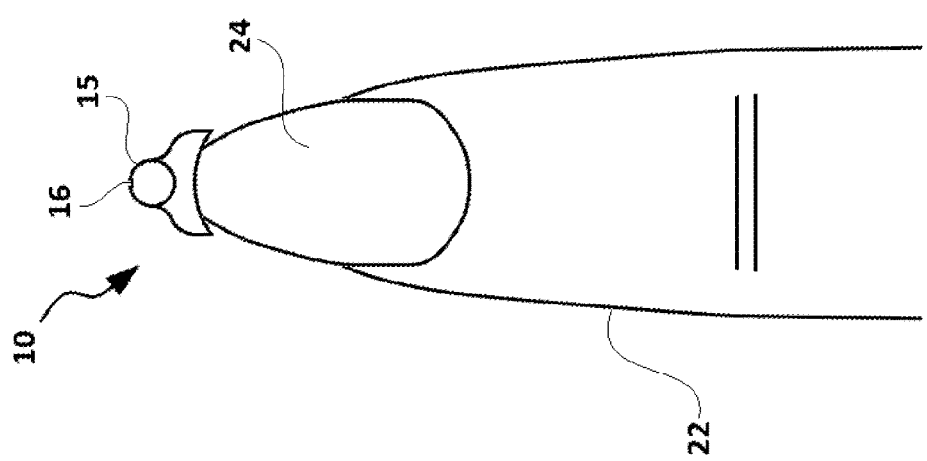
FIG. 7 is a plan view of the end of a user's index finger having the nail tip stylus of the invention in place on a fingernail extension.

For use, as in FIGS. 6 and 7, the user slides his/her fingernail or an extension (reference numerals 24, 26 are respectively, upper and lower sides of a fingernail extension) into sleeve 14, which is primarily formed of an elastomer, and preferably sized such that it is stretched to fit over the fingernail/extension. The end portion 20 of extension 12 should contact the tip of the user's finger (index finger 22 is shown in FIGS. 6 and 7) to establish a path for current flow from index finger 22 through sleeve 14 and to sphere 15. Extension 12 should not be so long as to bend substantially when in place, and potentially interfere in operation. The end of sphere 15 is manipulated by the user to contact and activate on contact, screen keys or icons, as desired. Contact with such capacitive touch sensors results in their activation, by interaction with the capacitance of the user's finger or due to the inherent capacitance of stylus 10, or both.

Where sleeve 14 is sized such that it does not stretch to fit, or even where it is, it may be preferable to include an adhesive to increase the bonding and reduce movement and slippage. The adhesive could be liquid/gel (poured into the sleeve and/or coated onto the fingernail/extension), or it could preferably be a double-coated adhesive tape, e.g., SA1020 POLYSIL SILICONE/ACRYLIC DOUBLE COATED ADHESIVE TAPE (available from Adhesive Applications, Easthampton Mass.). This product has a first side of the tape coated with an adhesive for bonding to silicone rubber, and the other side coated with a second adhesive for bonding to acrylic and other surfaces. To use it with stylus 10, the user would adhere the second adhesive side to the fingernail/extension, cut the tape to size it to fit sleeve 14, and insert the fingernail/extension into sleeve 14, whereby the first side adhesive would bond to the inner surface of sleeve 14.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, any of the terms "comprising", "including", containing", etc. are to be read expansively and without limitation. The methods and processes illustratively described herein suitably may be practiced in differing orders of steps, and that they are not necessarily restricted to the orders of steps indicated herein or in the claims. It is also noted that as used herein and in the appended claims, the singular forms "a," "an," and "the" include plural reference, and the plural include singular forms, unless the context clearly dictates otherwise. Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The invention has been described broadly and generically herein. Each of the narrower species and subgeneric groupings falling within the generic disclosure also form part of the invention. The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. An elastic-fit fingernail-attached stylus, comprising: an elastic sleeve which stretches to fit around the end of a user's fingernail or fingernail extension; an extension from the sleeve designed to fit under the distal end of a user's fingernail and to contact the user's finger; and a projection which is a substantially hollow sphere having a single outer wall with only one hole, which can deform under finger pressure to provide a frontal surface sufficient to connect the user's finger's capacitance with a touchscreen, said projection extending in the opposite direction directly away from the extension.

2. The elastic-fit fingernail-attached stylus of claim 1 wherein the projection which is composed of a silicone rubber composition which is 50 shore A durometer silicone.

3. The elastic-fit fingernail-attached stylus of claim 2 wherein the projection is composed of a silicone rubber composition which includes silicon dioxide or silicone oil.

4. A process of using an elastic-fit fingernail-attached stylus of claim 3 to activate touch screen keys, comprising: stretching the elastic sleeve to fit around the end of a user's fingernail or fingernail extension, such that the extension from the sleeve passes under the distal end of a user's fingernail and contacts the user's finger; and moving the user's finger to contact the projection with a touch screen keyboard.

5. The process of claim 4 further including cutting off any excess portion of the extension beyond that required to reach to the user's finger surface when the elastic sleeve is in position around the end of a user's fingernail or fingernail extension.

6. The process of claim 4 further including adhering tape coated on two sides with an adhesive to the user's fingernail or fingernail extension before fitting the elastic sleeve.

7. A process of using an elastic-fit fingernail-attached stylus of claim 2 to activate touch screen keys, comprising: stretching the elastic sleeve to fit around the end of a user's fingernail or fingernail extension, such that the extension from the sleeve passes under the distal end of a user's fingernail and contacts the user's finger; and moving the user's finger to contact the projection with a touch screen keyboard.

8. The process of claim 7 further including adding a gel, fluid, or adhesive to the inner surface of the sleeve before fitting the sleeve around the user's fingernail or fingernail extension.

9. The process of claim 7 further including cutting off any excess portion of the extension beyond that required to reach to the user's finger surface when the elastic sleeve is in position around the end of a user's fingernail or fingernail extension.

10. The process of claim 7 further including adhering tape coated on two sides with an adhesive to the user's fingernail or fingernail extension before fitting the elastic sleeve.

11. A process of using an elastic-fit fingernail-attached stylus of claim 1 to activate touch screen keys, comprising: stretching the elastic sleeve to fit around the end of a user's fingernail or fingernail extension, such that the extension from the sleeve passes under the distal end of a user's fingernail and contacts the user's finger; and moving the user's finger to contact the projection with a touch screen keyboard.

12. The process of claim 11 further including adding a gel, fluid, or adhesive to the inner surface of the sleeve before fitting the sleeve around the user's fingernail or fingernail extension.

13. The process of claim 11 wherein the elastic sleeve is stretched around the user's fingernail or fingernail extension.

14. The process of claim 11 further including cutting off any excess portion of the extension beyond that required to reach to the user's finger surface when the elastic sleeve is in position around the end of a user's fingernail or fingernail extension.

15. The process of claim 11 further including adhering tape coated on two sides with an adhesive to the user's fingernail or fingernail extension before fitting the elastic sleeve.

16. The elastic-fit fingernail-attached stylus of claim 1 composed of silicone rubber including a conducting material.

17. The elastic-fit fingernail-attached stylus of claim 16 wherein the conducting material is graphite.

18. The elastic-fit fingernail-attached stylus of claim 1 further including a gel, fluid, or adhesive added to the inner surface of the sleeve.

19. The elastic-fit fingernail-attached stylus of claim 1 further including a surface paint coating over the stylus.

* * * * *